US008306587B2

(12) United States Patent
Nishikido et al.

(10) Patent No.: US 8,306,587 B2
(45) Date of Patent: Nov. 6, 2012

(54) ANTENNA ELEMENT AND PORTABLE RADIO

(75) Inventors: Tomoaki Nishikido, Sendai (JP); Hironori Kikuchi, Sendai (JP); Yoshio Koyanagi, Yokohama (JP); Kenichi Sato, Sendai (JP); Hiroaki Ohmori, Sendai (JP)

(73) Assignee: Panasonic Corporation, Osaka (JP)

( * ) Notice: Subject to any disclaimer, the term of this patent is extended or adjusted under 35 U.S.C. 154(b) by 193 days.

(21) Appl. No.: 12/672,401

(22) PCT Filed: Aug. 10, 2007

(86) PCT No.: PCT/JP2007/065744

§ 371 (c)(1),
(2), (4) Date: Feb. 5, 2010

(87) PCT Pub. No.: WO2009/022385

PCT Pub. Date: Feb. 19, 2009

(65) Prior Publication Data

US 2011/0117976 A1 May 19, 2011

(51) Int. Cl.
*H04M 1/00* (2006.01)
*H01Q 1/24* (2006.01)
*H01Q 1/12* (2006.01)

(52) U.S. Cl. .................. 455/575.7; 455/575.3; 343/718; 343/702

(58) Field of Classification Search ............... 455/575.7, 455/575.3; 343/718, 702
See application file for complete search history.

(56) References Cited

U.S. PATENT DOCUMENTS

2002/0075192 A1 6/2002 Iwai
2003/0179143 A1* 9/2003 Iwai et al. ..................... 343/702
2004/0125032 A1 7/2004 Ikuta
2006/0071856 A1* 4/2006 Shinkai et al. ............. 343/7 MS
(Continued)

FOREIGN PATENT DOCUMENTS

JP 08-084013 A 3/1996
(Continued)

OTHER PUBLICATIONS

International Search Report mailed Sep. 25, 2007, in corresponding International Application No. PCT/JP2007/065744.

*Primary Examiner* — Ariel Balaoing
(74) *Attorney, Agent, or Firm* — Seed IP Law Group PLLC

(57) ABSTRACT

There are provided an antenna element and a portable radio that enable miniaturization, acquisition of a high gain, and broadening of a band and that copies compatible with multiple bands. A rectangular-parallelepiped-shaped antenna element is formed by folding two or more faces of a board-shaped monopole element having an rectangular shape so that the antenna element has a substantially rectangular first conductor plate 51 disposed in proximity to a hinge 4 while arranged at a predetermined space S from a lower circuit board (ground plate) 21, a substantially rectangular second conductor plate 52 that shares a widthwise one side of the first conductor plate 51 and that is arranged while bent to an angle of about 90° with respect to the first conductor plate, and a substantially rectangular third conductor plate 53 that shares another widthwise side of the second conductor plate 52 opposing the side shared by the first conductor plate 51 and the second conductor plate 52 and that is arranged at an angle of about 90° so as to oppose the first conductor plate 51.

4 Claims, 6 Drawing Sheets

U.S. PATENT DOCUMENTS

| | | | | |
|---|---|---|---|---|
| 2006/0142072 | A1* | 6/2006 | Krenz et al. | 455/575.3 |
| 2006/0214856 | A1* | 9/2006 | Nakano et al. | 343/702 |
| 2006/0232482 | A1* | 10/2006 | Chen | 343/702 |

FOREIGN PATENT DOCUMENTS

| | | | |
|---|---|---|---|
| JP | 10-209733 | | 8/1998 |
| JP | 2002-223114 | A | 8/2002 |
| JP | 2004-194211 | A | 7/2004 |
| JP | 2005-45646 | | 2/2005 |
| JP | 2005-086418 | A | 3/2005 |
| JP | 2005-175846 | A | 6/2005 |
| JP | 2005-269301 | | 9/2005 |
| JP | 2006-279159 | A | 10/2006 |
| WO | 2006/082918 | A1 | 8/2006 |

* cited by examiner

VSWR CHARACTERISTIC

VSWR CHARACTERISTIC

VSWR CHARACTERISTIC (A)

(B)

ANTENNA ELEMENT AND PORTABLE RADIO

TECHNICAL FIELD

The present invention relates to an antenna element and a portable radio equipped with the antenna element.

BACKGROUND ART

In relation to a portable radio equipped with such an antenna (e.g., a cellular phone), there is recently a growing demand for addition of functions of a plurality of radio systems; for instance, a GPS and Bluetooth (Registered Trademark). When an attempt is made to provide a cellular phone with a plurality of radio systems, a range of working frequency band becomes broader. For instance, the portable radio must be made compatible with an 800 MHz band, a 1.7 GHz band, and a 2 GHz band for communication of a cellular phone. Specifically, the portable radio must be made compatible with a 1.5 GHz band for GPS and 2.4 GHz band for Bluetooth. Accordingly, when an attempt is made to equip the cellular phone with such plural radio systems, a built-in antenna must ensure predetermined antenna performance for a plurality of frequency bands.

A rectangular-parallelepiped-shaped antenna element 200 has hitherto been proposed as shown in FIG. 7 (see; for instance, Patent Document 1). In the antenna 200, a rectangular-parallelepiped-shaped antenna element 201 whose minimum side is smaller than $\lambda/8$ ($\lambda$: a wavelength) is connected to a coaxial cable 202 and disposed in close proximity to a ground plate 202. It is shown that use of the rectangular-parallelepiped-shaped antenna element 202 makes a bandwidth broader.

An antenna element described in connection with Patent Document 2 shown in FIG. 8 has already been known as such a rectangular-parallelepiped-shaped antenna element. In an antenna element 300 described in connection with; for instance, Patent Document 2, a conductor plate 301 is connected to a conductor ground plate 303 by way of a metal wire 302 as shown in (A) of FIG. 8, and power is fed from a feeding point 305 by way of a metal wire 304. Meanwhile, a conductor wall 306 is electrically connected at the other end to an electromagnetic coupling adjustment plate 307, as well as being electrically connected at one end to the conductor plate 301. The electromagnetic coupling adjustment plate 307 is disposed while spaced at a predetermined gap away from the conductor ground plate 303 as shown in (B) of FIG. 8, thereby forming a capacitor between the conductor ground plate 303 and the electromagnetic coupling adjustment plate 307.

Incidentally, the antenna element 300 makes a frequency low by arranging the conductor wall 306 and the electromagnetic coupling adjustment plate 307; for instance, in such a way that a path from a shortcircuit area where the metal wire 302 is connected to the conductor plate 301 to an open end of the electromagnetic coupling adjustment plate 307 becomes longer. In particular, an arrangement is made in such a way that a current path from a feeding point where the metal wire 304 is connected to the conductor plate 301 to the shortcircuit area comes to a half wavelength of a desired resonance frequency, whereby both a reduced resonance frequency of an antenna and a broader band of a frequency characteristic are accomplished.

Patent Document 1: JP-A-2006-279159
Patent Document 2: JP-A-2002-223114

DISCLOSURE OF THE INVENTION

Problems that the Invention is to Solve

Even a compact antenna, such as that described in connection with Patent Document 2; however, requires an increase in the size of an antenna element in order to cover a lower frequency band. Further, the antenna element is a plate-like inversed-F antenna, and a ground plate is required to be placed beneath the element. In order to achieve a broader band, a required distance between the element and the base plate is of the order of 7 mm, and the antenna element is unsuitable for use in slim equipment, such as a portable radio.

On the contrary, as described in connection with Patent Document 1, when one half of the antenna element 202 is surrounded by the proximal ground plate 202, the band tends to become narrower as compared with a case where no ground plate is provided, and radiation efficiency also tends to become worse.

The present invention has been conceived in light of the circumstance and aims at providing an antenna element and a portable radio that enable miniaturization, achievement of a high gain, and broadening of a band and that also can cope with multiple bands.

Means for Solving the Problems

An antenna element according to the present invention includes: a substantially rectangular first conductor plate arranged at a predetermined space apart from a ground plate; a substantially rectangular second conductor plate that shares a widthwise one side of the first conductor plate and that is arranged at an angle of about 90° with respect to the first conductor plate; and a substantially rectangular third conductor plate that shares another widthwise side of the second conductor plate opposing the side shared by the first conductor plate and the second conductor plate, and that is arranged at an angle of about 90° so as to oppose the first conductor plate, and in the antenna element, electric power is fed to the first conductor plate from a substantial corner of the ground plate.

Further, a portable radio according to the present invention is a portable radio including a first housing accommodating a ground plate of the portable radio, a second housing equipped with a first antenna element, and a hinge for connecting the first housing to the second housing and holding the second housing rotatably with respect to the first housing, wherein the antenna element defined in claim 1 is provided in proximity to the hinge.

Preferably, the first antenna element provided in the second housing is capacitively coupled to any one of the first conductor plate, the second conductor plate, and the third conductor plate provided in the antenna element defined in claim 1, to thus operate as a synthetic antenna.

Preferably, in addition to having the first conductor plate, the second conductor plate, and the third conductor plate configuring the antenna element defined in claim 1, the antenna element has a fourth conductor plate sharing one side of the first conductor plate, one side of the second conductor plate, and one side of the third conductor plate.

Advantages of the Invention

According to the present invention, A rectangular-parallelepiped-shaped antenna element is formed by folding two or more faces of a board-shaped monopole element having an rectangular shape so that the antenna element has a first conductor plate arranged at a predetermined space from a ground plate, a second conductor plate that shares a widthwise one side of the first conductor plate, and a third conductor plate that shares another widthwise side of the second conductor plate opposing the side shared by the first conductor plate and the second conductor plate. The antenna element can much broaden a band when compared with a cubic antenna element having the same volume. Thus, a compact and broadband antenna can be realized. Further, electric power is fed to a substantial corner of the rectangular-parallelepiped antenna element from a substantial corner of the ground plate, whereby resonance arises in various frequency bands. Thus, a multiband antenna can be implemented.

Further, according to the present invention, in a folding portable radio having a hinge, an antenna element is placed in the vicinity of the hinge, whereby a high antenna gain is obtained over a broadband in both a closed state and an open state. Accordingly, a compact portable radio that can realize multiband can be provided.

DESCRIPTIONS OF THE REFERENCE NUMERALS AND SYMBOLS

10, 20 PORTABLE RADIO
2 LOWER HOUSING (FIRST HOUSING)
21 LOWER CIRCUIT BOARD (GROUND PLATE)
22 FIRST RADIO CIRCUIT
23 SECOND RADIO CIRCUIT
24 THIRD RADIO CIRCUIT
25 FOURTH RADIO CIRCUIT
26 DUPLEXER
27 MATCHING CIRCUIT
3 UPPER HOUSING (SECOND HOUSING)
31 UPPER CIRCUIT BOARD
4 HINGE
5 ANTENNA ELEMENT
51 FIRST CONDUCTOR PLATE
52 SECOND CONDUCTOR PLATE
53 THIRD CONDUCTOR PLATE
54 FOURTH CONDUCTOR PLATE
55 FEEDING CONDUCTOR

BEST MODES FOR IMPLEMENTING THE INVENTION

Embodiments of the present invention are hereinbelow described in detail by reference to the accompanying drawings.

(First Embodiment)

Figure 1:
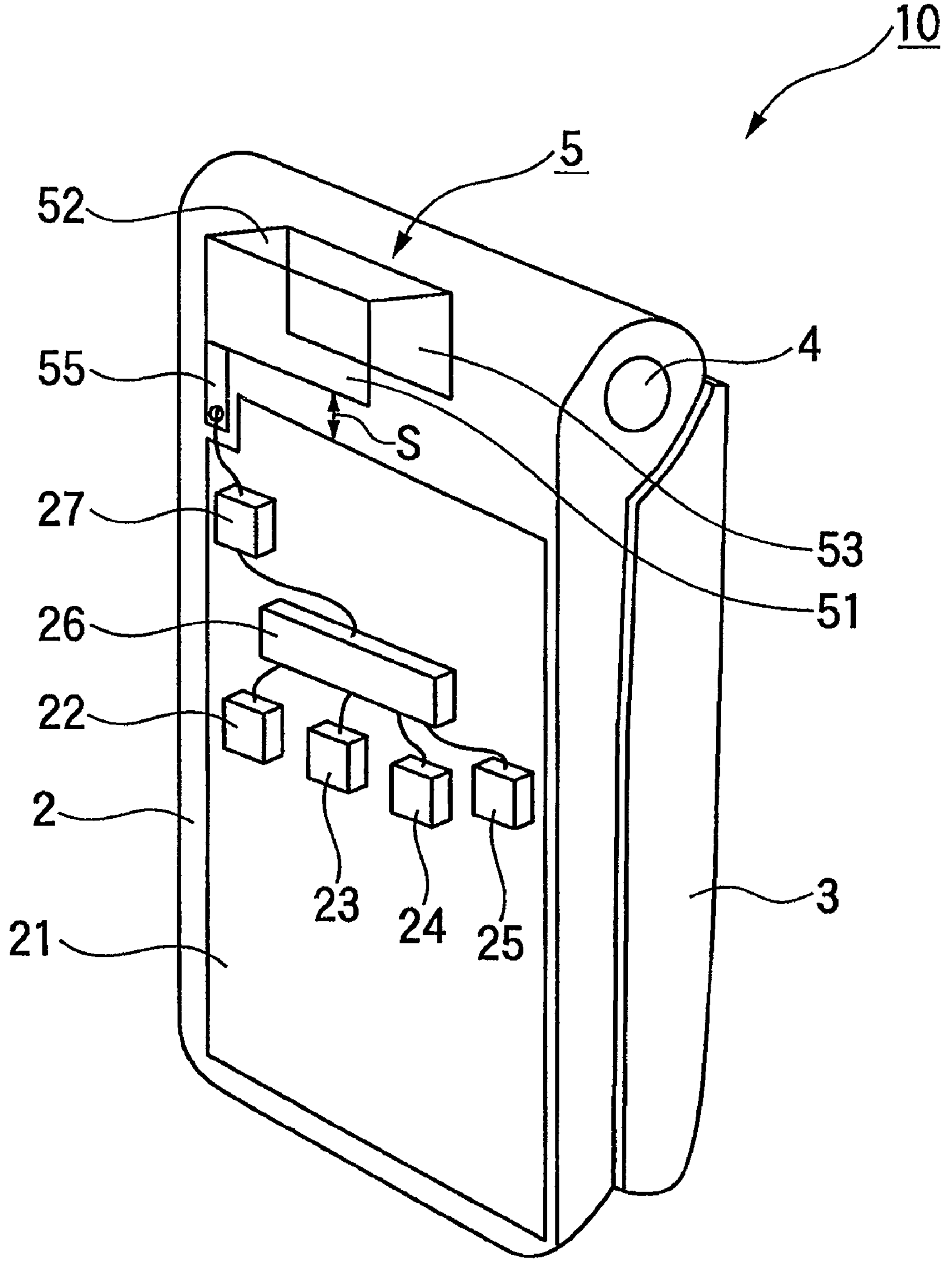
FIG. 1 is a perspective view showing a portable radio of a first embodiment of the present invention in a closed state.
Figure 2:
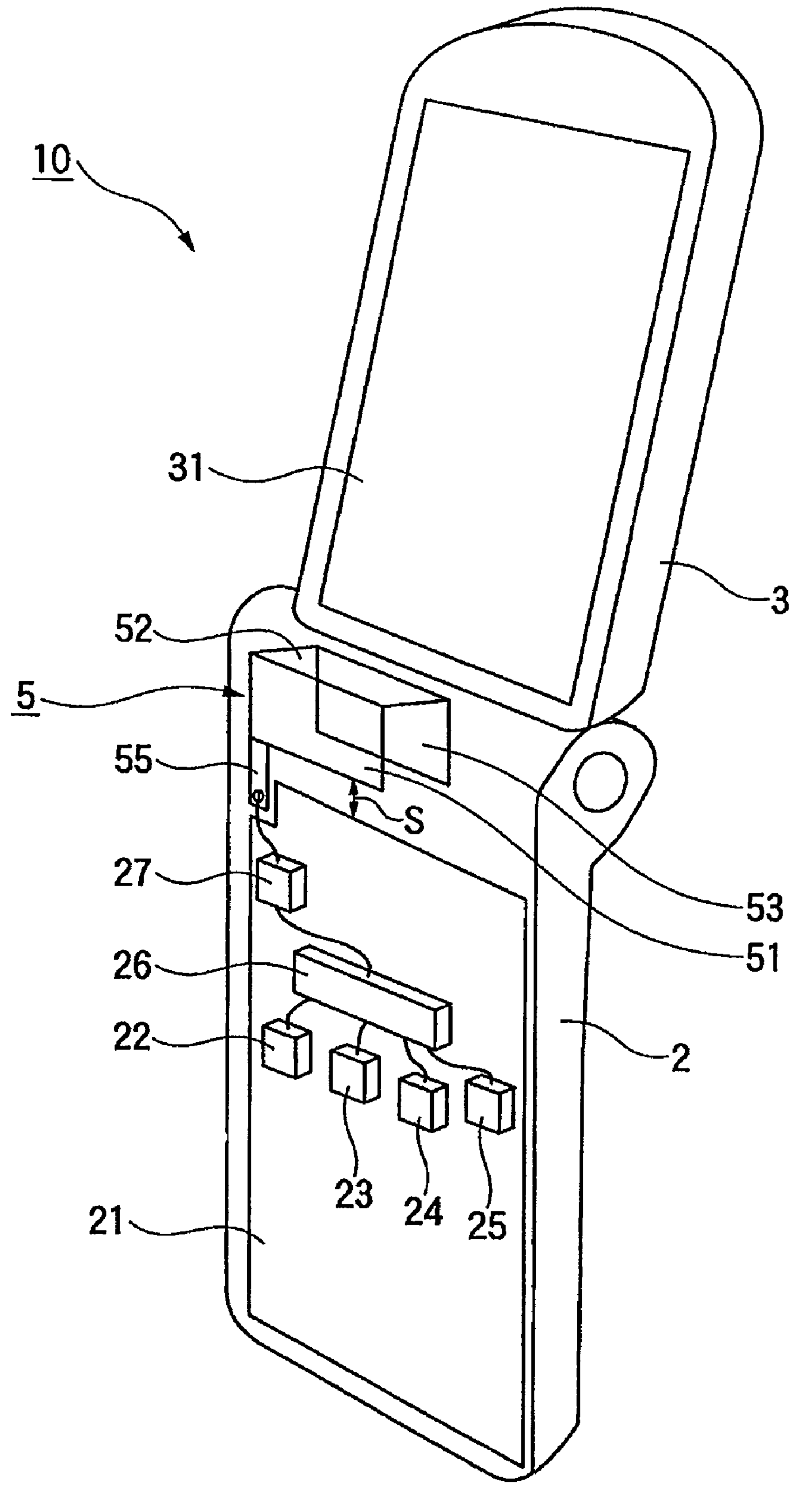
FIG. 2 is a perspective view showing the portable radio of the first embodiment in an open state.

FIGS. 1 and 2 show a folding portable radio 10 of a first embodiment of the present invention. The portable radio 10 has a lower housing 2 that is a first housing; an upper housing 3 that is a second housing; a hinge 4 that joins the lower housing 2 to the upper housing 3 rotatably; and an antenna element 5 making up a monopole antenna.

The lower housing 2 houses a lower circuit board 21 making up a ground plate (a ground) of the portable radio 10 and is configured so as to feed electric power from a corner of the ground plate to the antenna element 5. The lower housing 2 of the embodiment is made of a resin frame.

A first radio circuit 22, a second radio circuit 23, a third radio circuit 24, a fourth radio circuit 25, a duplexer 26, and a matching circuit 27 are mounted on the lower circuit board 21 and is made so as to measure; for instance, 45 mm×85 mm in the embodiment.

The first radio circuit 22, the second radio circuit 23, the third radio circuit 24, and the fourth radio circuit 25 of the embodiment are compatible with a 1.5 GHz frequency band, a 1.7 GHz frequency band, a 2 GHz frequency band, and a 2.4 GHz frequency band, respectively.

The duplexer 26 is for sharing an antenna among a plurality of radio frequency bands. In the present embodiment, the duplexer 26 is equipped with; for instance, bandpass filters conforming to respective frequency bands.

The matching circuit 27 performs a function of seeking matching between the antenna element 5 and circuit impedance (of generally 50Ω).

The upper housing 3 contains the upper circuit board 31. When the upper and lower housings are opened, the upper circuit board 31 and the antenna element 5 are capacitively coupled, to thus act as a housing antenna (operate as a synthetic antenna). The upper housing 3 of the present embodiment is also made of a resin frame, as is the lower housing 2. In the present embodiment, the upper circuit board 31 is made so as to measure; for instance, 45 mm×75 mm.

The antenna element 5 is disposed in the vicinity of a hinge. The antenna element 5 has a first conductor plate 51, a second conductor plate 52, a third conductor plate 53, and a feeding conductor 55 and is configured so as to feed electric power from a corner of the ground plate to the first conductor plate 51 by way of the feeding conductor 55. In particular, in relation to feeding of electric power to the embodiment, electric power is fed from a substantial corner of the lower circuit board 21 to a substantial corner of the first conductor plate 51 by way of the feeding conductor 55. Each of the conductor plates 51 to 53 of the embodiment has a thickness of; for instance, 0.1 mm. In relation to specific sizes of the first to third conductor plates 51 to 53 of the embodiment, the first conductor plate 51 has a size of; for instance, 22×6 mm; the second conductor plate 52 has a size of; for instance, 22×5 mm; and the third conductor plate 53 has a size of; for instance, 22×6 mm.

In the present embodiment, the antenna element 5 is fastened by means of; for instance, an insulating holder having a low dielectric constant.

The first conductor plate 51 is made up of a substantially rectangular substance disposed in the vicinity of the hinge 4 while arranged at a predetermined interval apart from the ground plate; and is connected to the matching circuit 27 on the ground plate by way of the feeding conductor 55. The first conductor plate 51 and the second conductor plate 52 share a long side and arranged while bent at an angle of about 90°.

The first conductor plate 51 is a thin conductor having a substantially rectangular shape and connected to the duplexer 26 by way of the matching circuit 27. The duplexer 26 is connected respectively to the first radio circuit 22 to the fourth radio circuit 25 that are the radio sections of respective communications systems.

Likewise, the second conductor plate 52 is a thin conductor having a substantially rectangular shape and is made up of a substantially rectangular substance that shares a widthwise side of the first conductor plate 51 and that is bent to an angle of about 90° with respect to (a direction of plane of) the first conductor plate 51. The second conductor plate 52 and the third conductor plate 53 share their widthwise one side (long side) and are disposed while bent to an angle of about 90°. Thus, the first conductor plate 51 and the third conductor plate 53 oppose each other.

The third conductor plate 53 is likewise a thin conductor having a substantially rectangular shape and shares one of two widthwise sides (long sides) of the second conductor plate 52 that is not shared by the first conductor plate 51. The third conductor plate 53 is made up of a substantially rectangular substance that is disposed while bent to an angle of about 90° with respect to the second conductor plate 52 so as to face the first conductor plate 51. In the present embodiment, an interval S between the first conductor plate 51, the third conductor plate 53 and the lower circuit substrate 21 is of the order of 5 mm.

Operation of the present embodiment is now described.

Figure 3:
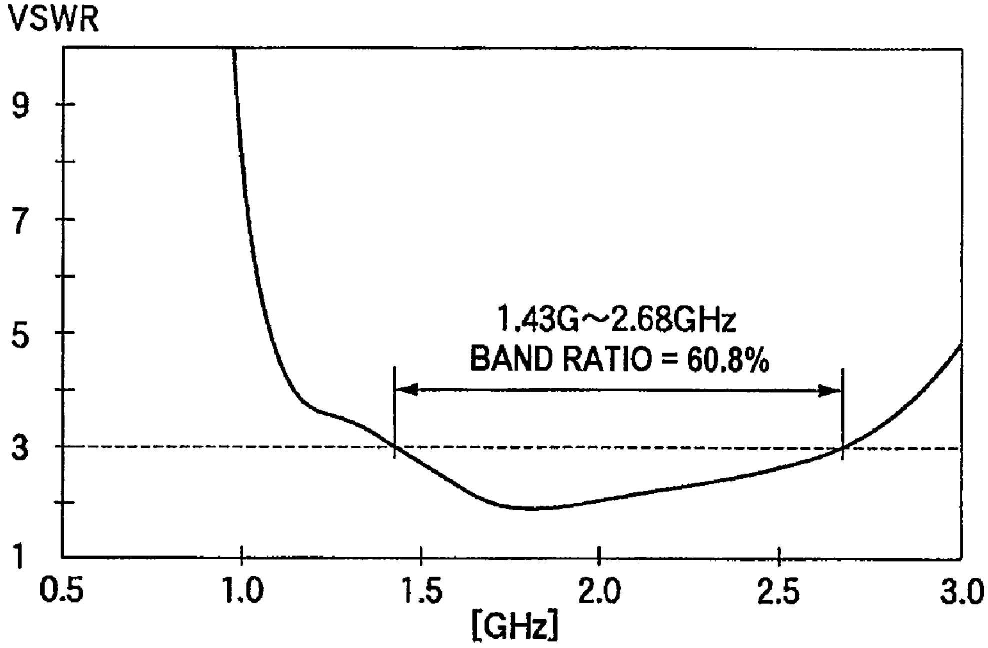
FIG. 3 is a graph showing a VSWR characteristic achieved when the portable radio of the first embodiment is in the closed state.
Figure 4:
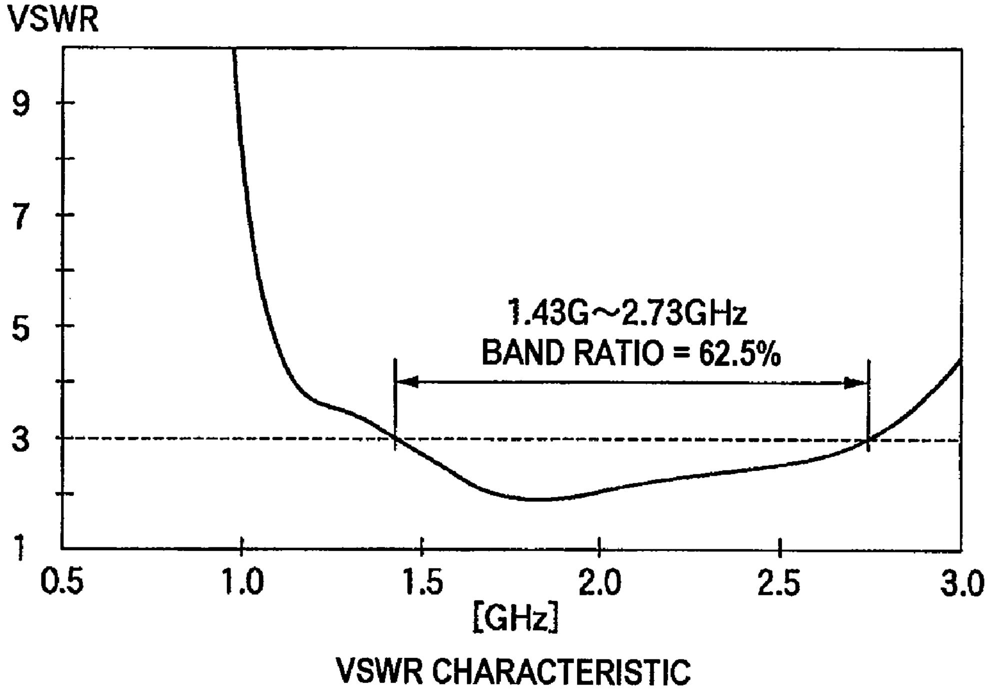
FIG. 4 is a graph showing a VSWR characteristic achieved when the portable radio of the first embodiment is in the open state.

FIGS. 3 and 4 are plots showing VSWR characteristics yielded when the upper and lower housings 23 are opened and closed. In the present invention, a range of frequency at which VSWR≦3 is satisfied is defined as a band width (a working frequency band). A horizontal axis represents a frequency, and a vertical axis represents a voltage standing wave ratio (hereinafter called a VSWR).

The following results are obtained as a result of examination of band ratios (a ratio of a bandwidth to a center frequency) acquired when the housings are closed and opened.

In the present embodiment, when the housings are closed, a frequency band fulfilling a condition of VSWR≦3 ranges from 1.43 GHz to 2.68 GHz (a center frequency: 2.055 GHz, and a bandwidth: 1.25 GHz), and a band ratio is 60.8%.

Meanwhile, in the present embodiment, when the housings are opened, the frequency band fulfilling the condition of VSWR≦3 ranges from 1.43 GHz to 2.73 GHz (a center frequency: 2.08 GHz, and a bandwidth: 1.3 GHz), and a band ratio is 62.5%.

The principle of the antenna element 5 of the embodiment will now be described.

(i) Principle of a Broadband:

a) Electric power is fed to the corner of the first conductor plate 51 (a rectangular, board-like conductor plate), whereby resonance arises in various frequency bands, to thus implement multiple bands. Specifically, electric power is fed to the corner of the first conductor plate 51 (the board-like conductor plate) rather than to the center of the same, whereby frequency bands from lower bands to higher bands can be covered.

b) The same also applies to feeding of power from the lower circuit board 21 that is the ground plate. Since the length of the element is a half wavelength or less, distribution of an antenna current exists in the ground plate. For this reason, feeding electric power from the corner of the lower circuit board 21 (the ground plate) rather than from the center of the same is suitable for multiple bands ranging from a low frequency band. A compact antenna can thereby implement multiple bands.

c) In relation to the three dimensional shape of the antenna element 5, a rectangular parallelepiped (each of the conductor plates is rectangular) realizes a broader band than does a cube (each of the conductor plates is square) having the same volume, as described in connection with the present embodiment. The reason for this is specifically that a resonance frequency band increases because the shape of rectangular parallelepiped is not symmetrical.

(ii) An Aspect Ratio of the Conductor Plate that Implements a Broad Band:

a) A rectangular shape (a rectangular) is preferable for the first conductor plate 51 (the board-like conductor plate). However, the essential requirement is that the aspect ratio should vary by 20% or more [it is particularly better that a side of the first conductor plate opposing the widthwise direction of the lower circuit board 21 (the circuit board) be longer than a side of the same orthogonal to the widthwise direction].

b) Operation performed when the upper and lower housings are opened: The upper circuit board 31 of the upper housing 3 and the second conductor plate (the board-like conductor plate) 52 or the third conductor plate (the board-like conductor plate) 53 of the lower housing 2 are capacitively coupled, whereby the upper circuit board 31 is excited, to thus act as an antenna (the first antenna). Since the volume of the antenna becomes eventually larger, realization of a broadband becomes feasible as compared with a state in which the upper housing and the lower housing are closed. An antenna gain that is higher than that achieved in a closed state is acquired particularly at a low frequency band.

Therefore, according to the present embodiment, the antenna element despite its small size can acquire a superior antenna characteristic even from a low frequency band by feeding electric power from the corner of the lower circuit board 21 serving as the ground plate to the corner of the first conductor plate 51 (the board-like conductor plate), so that a broadband characteristic can be implemented.

In the present embodiment, the antenna element 5, which is a box-shaped antenna, is disposed in proximity to the hinge 4 of the folding portable radio 10, whereby the portable radio 10 can be built in a compact size. Further, a high communication gain and frequency bands of a plurality of communications systems can be acquired. A high communication gain can be acquired even in both a closed state and an open state of the lower housing 2 serving as the first housing and the upper housing 3 serving as the second housing.

(Second Embodiment)

A second embodiment of the present invention is next described by reference to FIGS. 5 and 6. Elements of the present embodiment that are the same as those of the first embodiment are assigned the same reference numerals, and their repeated explanations are omitted.

Figure 5:
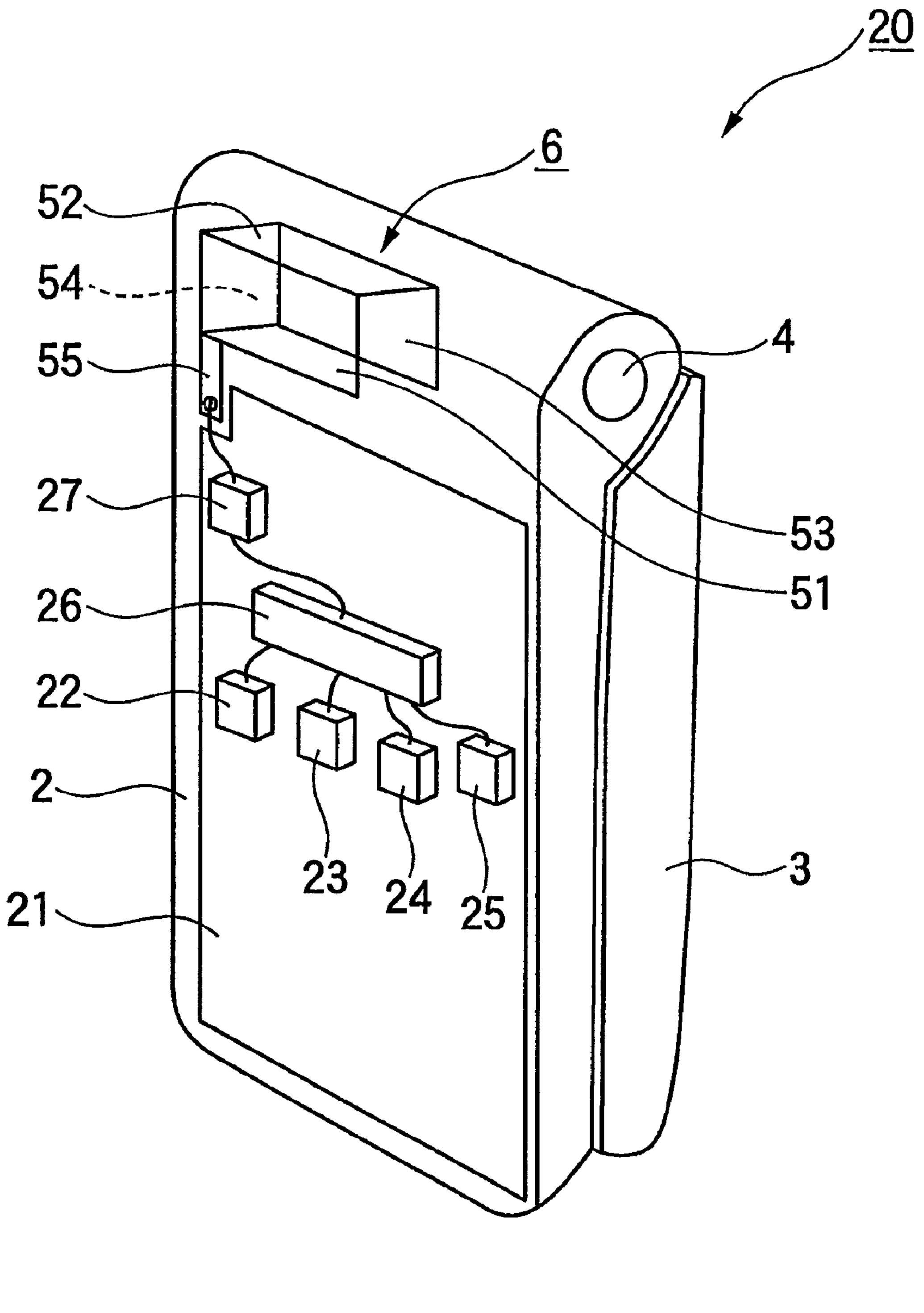
FIG. 5 is a perspective view showing a portable radio of a second embodiment in a closed state.

FIG. 5 shows a portable radio 20 of the present embodiment. The portable radio 20 differs from the portable radio 10 of the first embodiment in that in addition to having the first conductor plate 51 to the third conductor plate 53, the antenna element 6 making up the first antenna has a fourth conductor plate 54.

The fourth conductor plate 54 is thin conductor having a substantially rectangular shape as do the other conductor plates and shares (a total of three sides) one side of the first conductor plate 51, one side of the second conductor plate 52, and one side of the third conductor plate 53. In the present embodiment, the fourth conductor plate 54 is provided on an end face that is on the same side where the feeding conductor 55 is disposed. The fourth conductor plate 54 of the present embodiment measures 5 mm long×6 mm wide. Even in the present embodiment, the antenna element 6 is fastened by means of; for instance, an insulating holder having a low dielectric constant, as in the case with the first embodiment.

Figure 6:
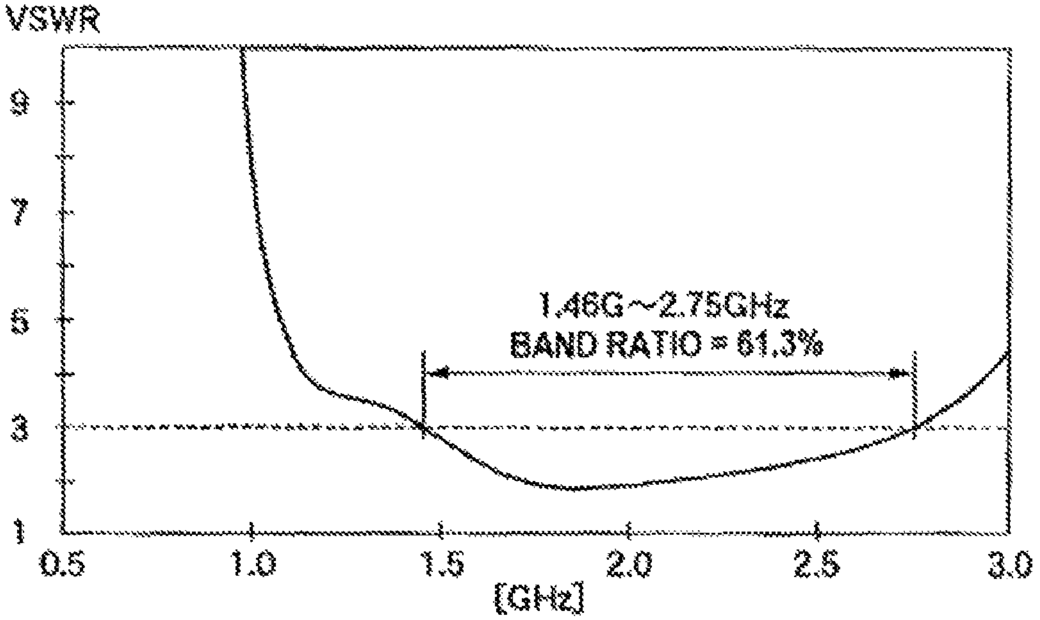
FIG. 6 is a graph showing a VSWR characteristic achieved when the portable radio of the second embodiment is in the closed state.
Figure 7:
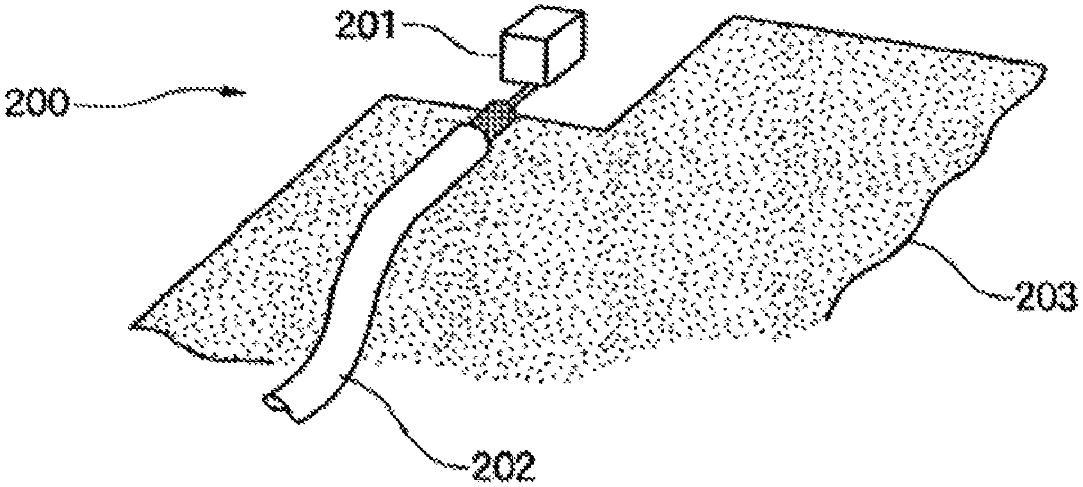
FIG.7 PRIOR ART
FIG. 7 is a perspective view of a principal feature showing another relate-art antenna element.
Figure 8:
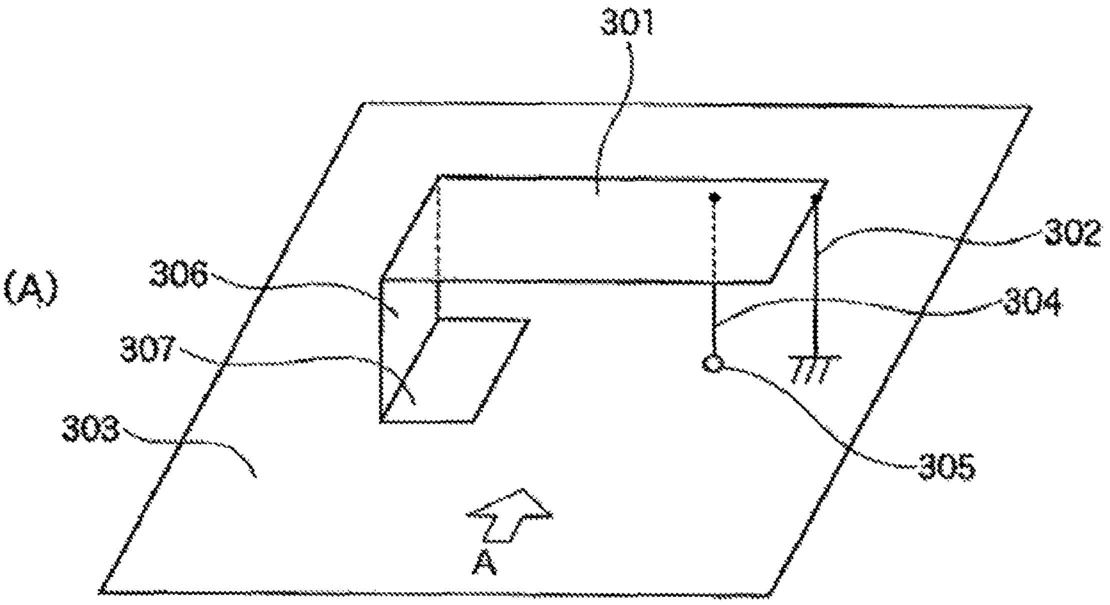
FIG. 8 PRIOR ART
In FIG. 8, (A) is a perspective view showing a still another related-art antenna element, and (B) is a side view of the antenna element.
Figure 8:
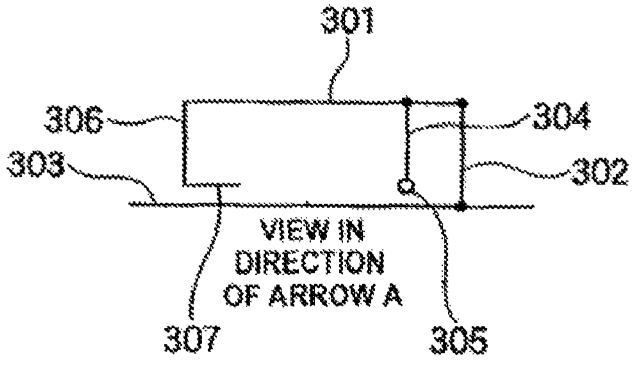
FIG. 8 PRIOR ART

FIG. 6 is a graph showing a VSWR characteristic achieved when the housings are closed. A range of frequency where VSWR≦3 can be satisfied is assumed to be defined as a bandwidth (a working frequency band) even in connection with FIG. 6.

According to the graph shown in FIG. 6, a frequency band of VSWR≦3 achieved when the housings are closed ranges from 1.46 GHz to 2.75 GHz (a center frequency: 2.105 GHz, and a band width: 1.29 GHz), and a band ratio is 61.3%.

According to the present embodiment, when the housings are closed, a band ratio of the antenna element 6 of the present embodiment is 61.3% when compared with the band ratio of the antenna element 5 that is 60.8%. An attempt can be made to make a band slightly wider than that acquired by the antenna element 5 of the first embodiment. As mentioned above, since a broader band can be implemented, the antenna can be made more compact in conformance with a desired frequency band.

The present invention is not limited to the embodiments and can be implemented in various forms without departing the scope of substance of the present invention.

The antenna element of the present invention can specifically be placed at an upper end of a straight-type or slide-type portable radio, in addition to the folding portable radio, such as those described in connection with the first and second embodiments. In the case of a slide-type portable radio, an advantage substantially identical with that yielded in a closed state is yielded. A conductor element making up the antenna element may also be a flexible substrate in place of the board-shaped conductor plate.

Although the present invention has been described in detail by reference to the specific embodiments, it is manifest to those skilled in the art that the present invention is susceptible to various alterations or modifications without departing the scope of spirit of the invention. In the first and second embodiments, the antenna elements 5 and 6 are configured so as to be fastened by means of; for instance, an insulating holder having a low dielectric constant. However, the configuration is not limited to that mentioned above, so long as a similar advantage is yielded.

Industrial Applicability

As mentioned above, according to the present invention, two faces or more of a plate-shaped monopole element having an rectangular shape are folded, thereby making up a rectangular-parallelepiped-shaped antenna element. The antenna element is superior to a cubic antenna element in terms of an antenna characteristic. It becomes possible to achieve miniaturization, acquisition of a high gain, and implementation of a broadband. Hence, the antenna element lends itself to use for a plurality of radio systems to which functions; for instance, a GPS, Bluetooth, and the like, can be added and, by extension, application to an antenna of a portable radio, such as a cellular phone and a PDA.

The invention claimed is:

1. An antenna element comprising:

a substantially oblong rectangular first conductor plate spaced apart from a ground plate;

a substantially rectangular second conductor plate that shares a widthwise one side of the first conductor plate and that is arranged at an angle of about 90° with respect to the first conductor plate; and a substantially rectangular third conductor plate that shares another widthwise side of the second conductor plate opposite the side shared by the first conductor plate and the second conductor plate, the third conductor plate arranged at an angle of about 90° relative to the second conductor plate and opposing the first conductor plate;

a first housing accommodating the ground plate;

a second housing equipped with a first antenna element;

and a hinge for connecting the first housing to the second housing and holding the second housing rotatably with respect to the first housing, wherein the antenna element is provided in proximity to the hinge, the first conductor plate is electrically connected to a corner of the ground plate, and an electrical connection is made at a corner of the ground plate to electrically connect the first conductor plate to the ground plate and an electrical connection is made at a corner of the first conductor plate to electrically connect the first conductor plate to the ground plate.

2. The portable radio according to claim 1, wherein the first antenna element provided in the second housing is capacitively coupled to any one of the first conductor plate, the second conductor plate, and the third conductor plate provided in the antenna element.

3. The antenna element according to claim 1, further comprising a fourth conductor plate sharing one side of the first conductor plate, one side of the second conductor plate, and one side of the third conductor plate.

4. The antenna element according to claim 1, wherein portions of the first conductor plate and the third conductor plate not connected by the second conductor plate are spaced apart and separated by a void space.

* * * * *